US010754527B2

(12) United States Patent
Jafarzadeh et al.

(10) Patent No.: US 10,754,527 B2
(45) Date of Patent: Aug. 25, 2020

(54) RECORDING ERASER

(71) Applicants: Saeed Jafarzadeh, Bakersfield, CA (US); Sheriff Sadiqbatcha, Manteca, CA (US)

(72) Inventors: Saeed Jafarzadeh, Bakersfield, CA (US); Sheriff Sadiqbatcha, Manteca, CA (US)

( * ) Notice: Subject to any disclaimer, the term of this patent is extended or adjusted under 35 U.S.C. 154(b) by 14 days.

(21) Appl. No.: 16/250,861

(22) Filed: Jan. 17, 2019

(65) Prior Publication Data
US 2020/0233566 A1  Jul. 23, 2020

(51) Int. Cl.
| | | |
|---|---|---|
| *G06F 3/0484* | (2013.01) | |
| *G02B 27/09* | (2006.01) | |
| *G06F 3/03* | (2006.01) | |
| *G06F 9/30* | (2018.01) | |
| *G06F 3/038* | (2013.01) | |

(52) U.S. Cl.
CPC ..... *G06F 3/04845* (2013.01); *G02B 27/0977* (2013.01); *G06F 3/0304* (2013.01); *G06F 3/038* (2013.01); *G06F 9/30003* (2013.01)

(58) Field of Classification Search
CPC .... G06F 3/04845; G06F 3/0304; G06F 3/038; G06F 9/30003; H04N 7/147; H04N 7/15; H04N 19/115; H04N 19/167; H04N 19/174; H04N 19/85; H04N 5/232; H04N 5/272; H04N 7/152; H04N 1/387; H04N 1/6055; H04N 21/2143; H04N 21/2187; H04N 21/4122; H04N 21/4143; H04N 21/422; H04N 21/42202; H04N 21/4223; H04N 21/43632; H04N 5/2224; H04N 5/2228; H04N 5/2253; H04N 5/2624; H04N 5/445; H04N 5/44504; H04N 5/44513; H04N 7/0117; H04N 7/142; H04N 7/157; H04N 7/18; H04N 9/3182; H04N 9/3185; H04N 9/3194; H04N 9/641

USPC ......................................................... 358/1.15
See application file for complete search history.

(56) References Cited

U.S. PATENT DOCUMENTS

| | | | | |
|---|---|---|---|---|
| 6,865,551 | B1 * | 3/2005 | Stefik | G06F 21/10 |
| | | | | 375/E7.009 |
| 7,117,180 | B1 * | 10/2006 | Stefik | G06F 21/10 |
| | | | | 705/51 |
| 7,288,751 | B2 * | 10/2007 | Cartlidge | G02B 21/0008 |
| | | | | 250/208.1 |
| 7,385,168 | B2 * | 6/2008 | Cartlidge | G02B 21/0008 |
| | | | | 250/208.1 |

(Continued)

*Primary Examiner* — Negussie Worku
(74) *Attorney, Agent, or Firm* — Ansari Katiraei LLP; Arman Katiraei; Sadiq Ansari

(57) ABSTRACT

An apparatus is provided for erasing content from a surface while capturing the content that is being erased for recreation in a digital format. The apparatus may include a base with an erasing element, and an imaging device disposed about a center of the base with an effective field of view above a top of the base. The apparatus may include an upper body with a first reflective surface reflecting an area around the base into the imaging device's field of view. The apparatus may include a second reflective surface at the top of the base to move the reflection of the area around the base from a border towards a center of the first reflective surface. The apparatus may include a set of supports that elevate the first reflective surface over the imaging device, and at least one sensor to track movements of the apparatus.

19 Claims, 11 Drawing Sheets

(56) References Cited

U.S. PATENT DOCUMENTS

| | | | |
|---|---|---|---|
| 7,439,478 B2* | 10/2008 | Cartlidge | G01N 21/6458 |
| | | | 250/208.1 |
| 8,723,815 B2* | 5/2014 | Hildebrandt | G06F 1/1605 |
| | | | 341/171 |
| 2006/0192081 A1* | 8/2006 | Cartlidge | G02B 27/0012 |
| | | | 250/208.1 |
| 2018/0281811 A1* | 10/2018 | Tochioka | B60W 50/12 |

* cited by examiner

RECORDING ERASER

BACKGROUND ART

Presentation boards are used in business settings, classrooms, homes, and other locations to collaborate and convey information. Presentation boards may include chalkboards, dry-erase boards, digital presentation boards, and/or other erasable mediums that can be written on and erased.

Participants in a presentation may be disengaged and may pay less attention to the speaker or presenter when having to take notes and/or copy what is being written onto a presentation board. This is especially true in a classroom setting. Students attempt to follow an instructor's presentation while simultaneously taking notes of what the instructor writes on the presentation board. Students rely on the notes to review and/or further study the materials written on the presentation board at a later time.

Voice recordings may capture the presenter's spoken words, but not the contents of the presentation board. Participants may take pictures of the presentation board, but these pictures may lack resolution and/or clarity to decipher text on the presentation board, especially when the picture is taken far away from the presentation board or there are other participants partially blocking the view of the presentation board. Moreover, participants taking pictures during the presentation can be disruptive, and cause one or more participants (e.g., those taking pictures and those distracted by the picture taker) to temporarily lose track of the presentation.

DETAILED DESCRIPTION

The following detailed description refers to the accompanying drawings. The same reference numbers in different drawings may identify the same or similar elements.

Disclosed is an apparatus for erasing content from a presentation board and/or other surface while simultaneously capturing the content that is being erased for recreation in a digital format. The apparatus, also referred to herein as the "recording eraser", may include at least an erasing element, sensor, and imaging device.

Figure 1:
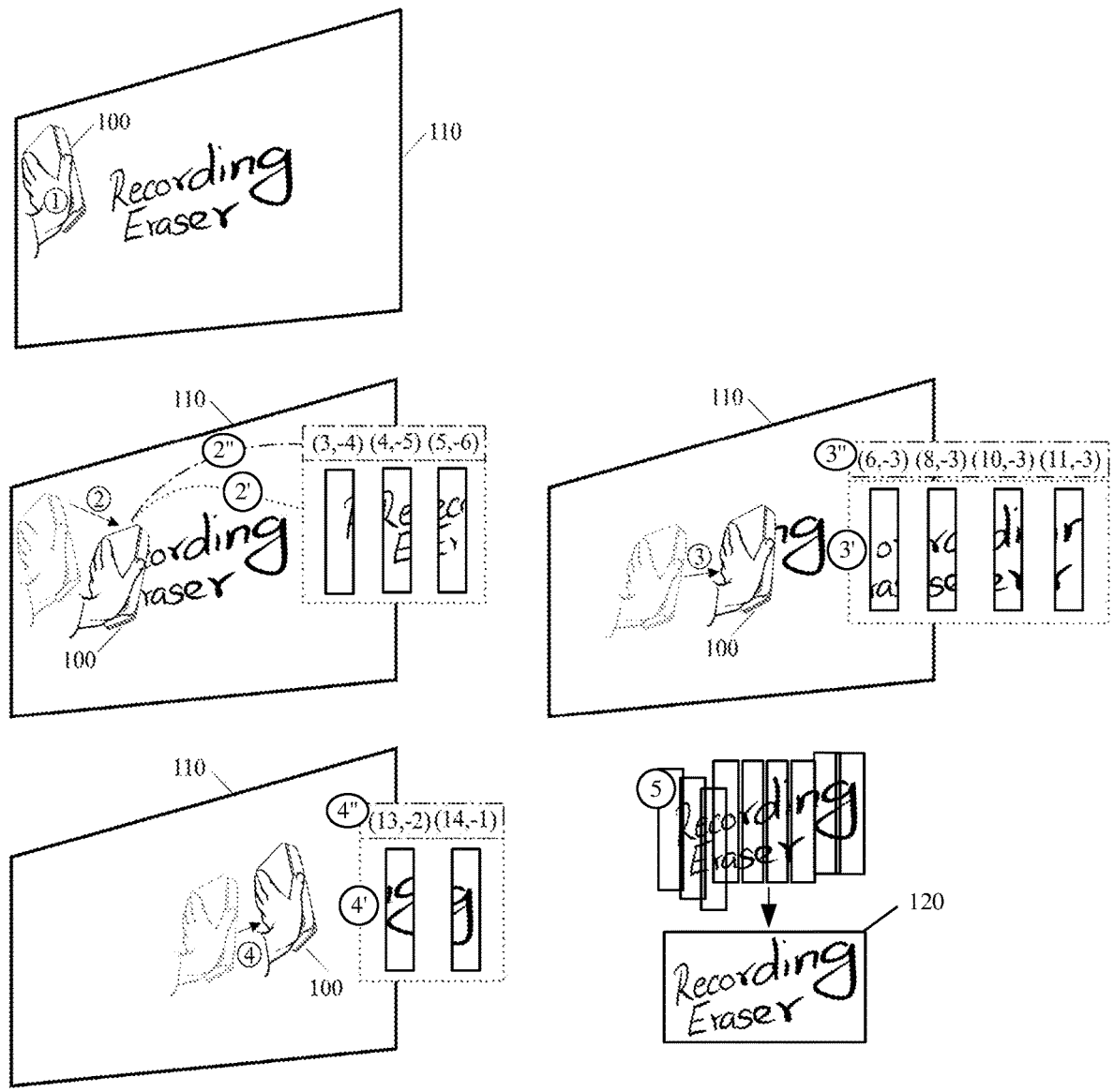
FIG. 1 illustrates example operation of the recording eraser in accordance with some embodiments described herein.

FIG. 1 illustrates example operation of the recording eraser 100 in accordance with some embodiments described herein. The figure includes usage of recording eraser 100 on presentation board 110 with various markings that were created by one or more presenters.

Presentation board 110 may be a chalkboard, dry-erase board, digital board, and/or other medium that can be written to and erased, and the markings may be made using chalk, ink, digital ink, or other writing instrument. The markings may include text, images, symbols, and/or arbitrary writings.

As shown in FIG. 1, recording eraser 100 may be placed (at 1) against the surface of presentation board 110, and moved (at 2, 3, and 4) in an arbitrary manner to erase the markings on presentation board 110 that come into contact with the erasing element of recording eraser 100. As recording eraser 100 is moved (at 2, 3, and 4), an imaging device on recording eraser 100 continuously takes (at 2', 3', and 4') images of different parts of presentation board 110 that are before or adjacent to recording eraser 100, and one or more sensors of recording eraser 100 track (at 2", 3", and 4") the movements to determine a relative position of recording eraser 100 on presentation board 110 at different times when different images are taken.

The images (e.g., images taken at 2', 3' and 4') may be processed (at 5) in conjunction with the tracking data (e.g., movements tracked at 2", 3", and 4") to recreate the markings that were erased from presentation board 110. File 120 may be created from the processed images and tracking data, and used to store the recreated markings. For instance, the images may be stitched together based on the tracking data and/or overlapping regions of neighboring images to recreate the markings as a composite image. File 120 may be in one of several different digital formats (e.g., a presentation file format, a document file format, an image file format, etc.), and may be viewed on different client devices.

Figure 2:
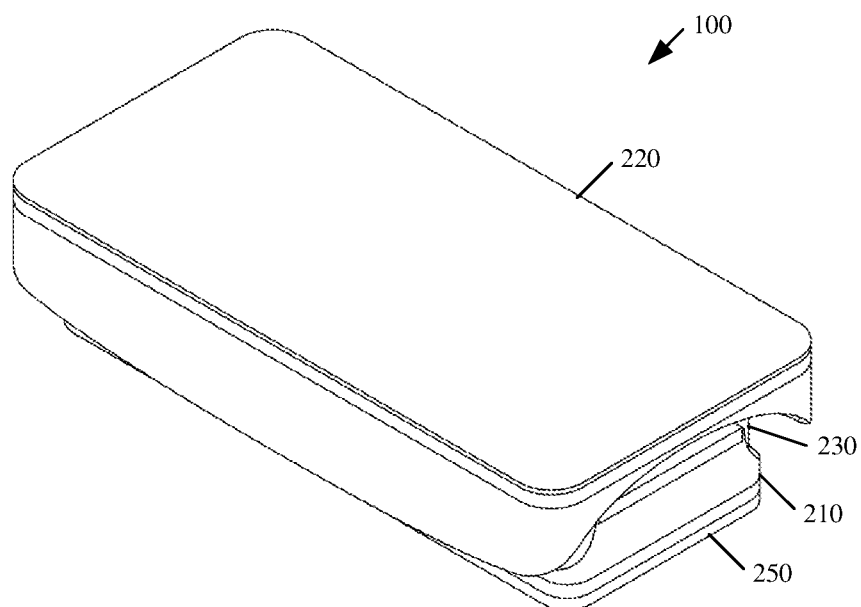
FIG. 2 provides a top perspective view of the recording eraser in accordance with some embodiments described herein.
Figure 3:
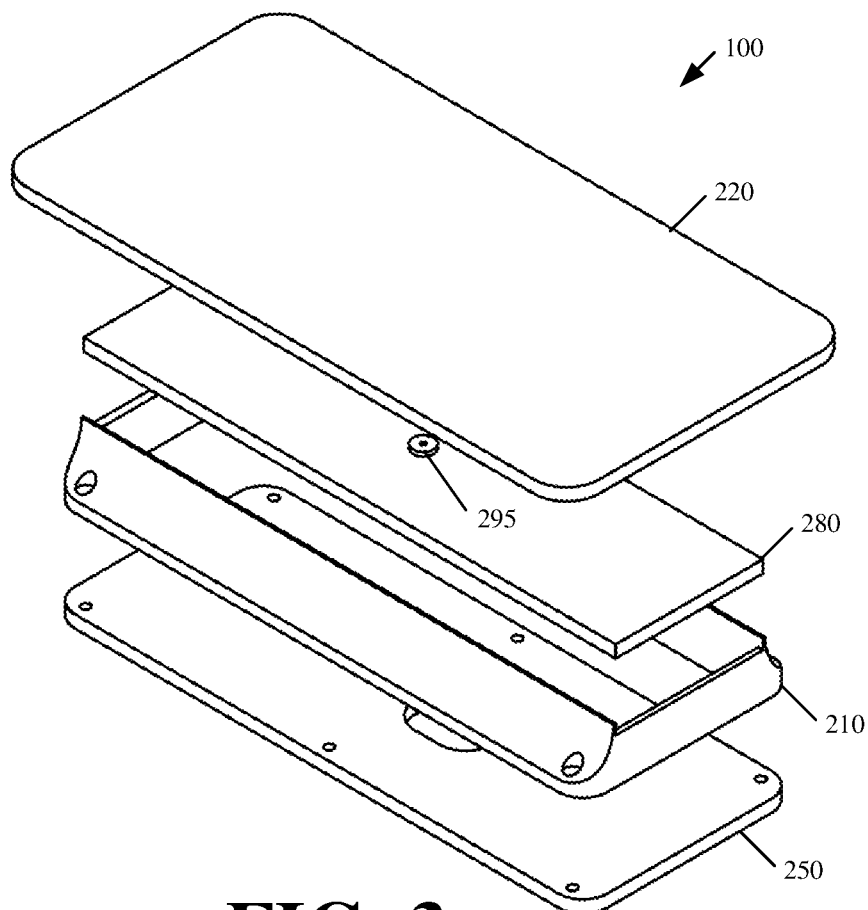
FIG. 3 provides a partial cutaway exploded top perspective view of the recording eraser in accordance with some embodiments described herein.
Figure 4:
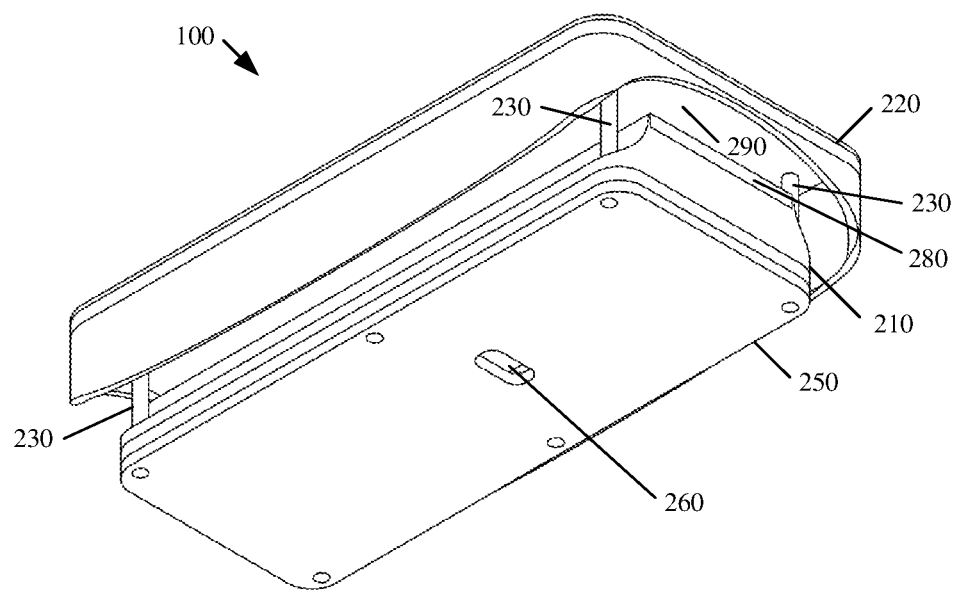
FIG. 4 provides a bottom perspective view of the recording eraser in accordance with some embodiments described herein.
Figure 5:
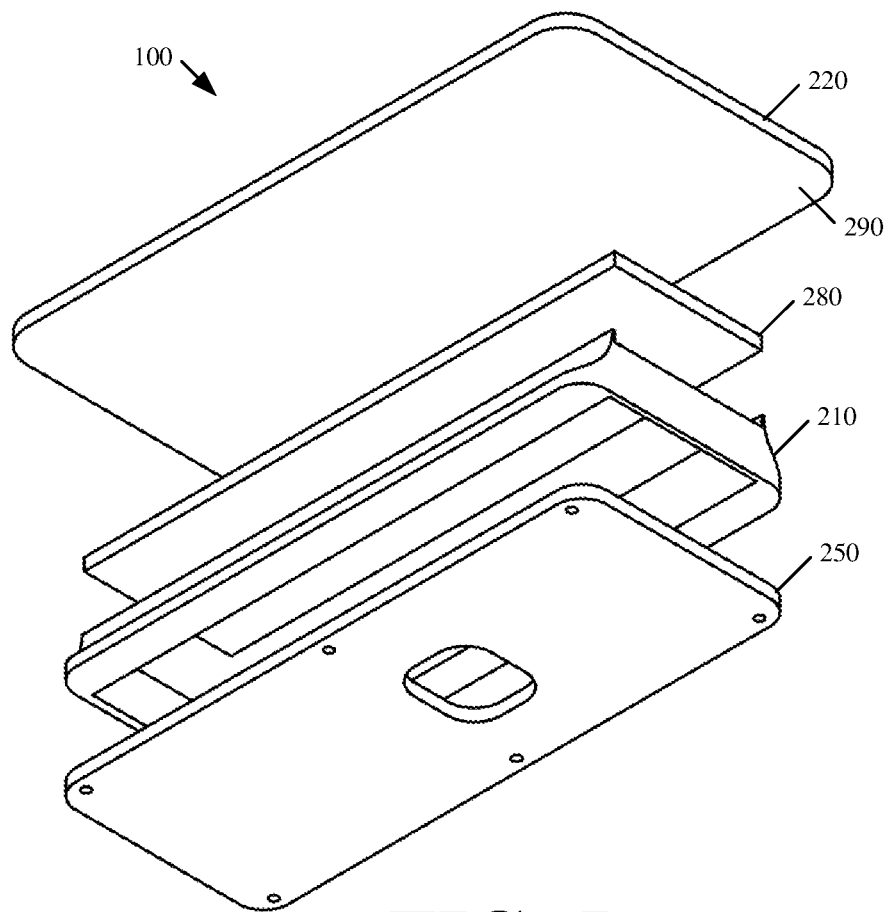
FIG. 5 provides a partial cutaway exploded bottom perspective view of the recording eraser in accordance with some embodiments described herein.
Figure 6:
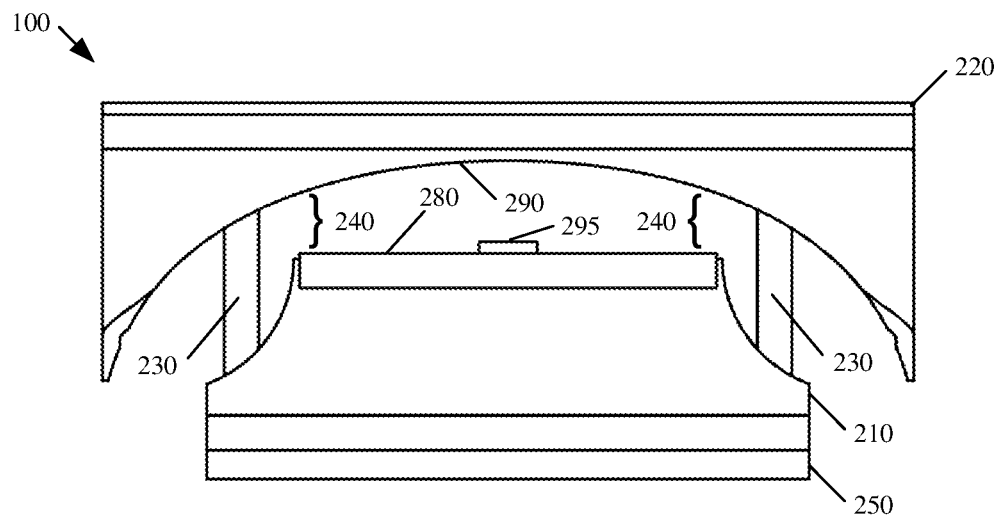
FIG. 6 provides a front view of the recording eraser in accordance with some embodiments described herein.
Figure 7:
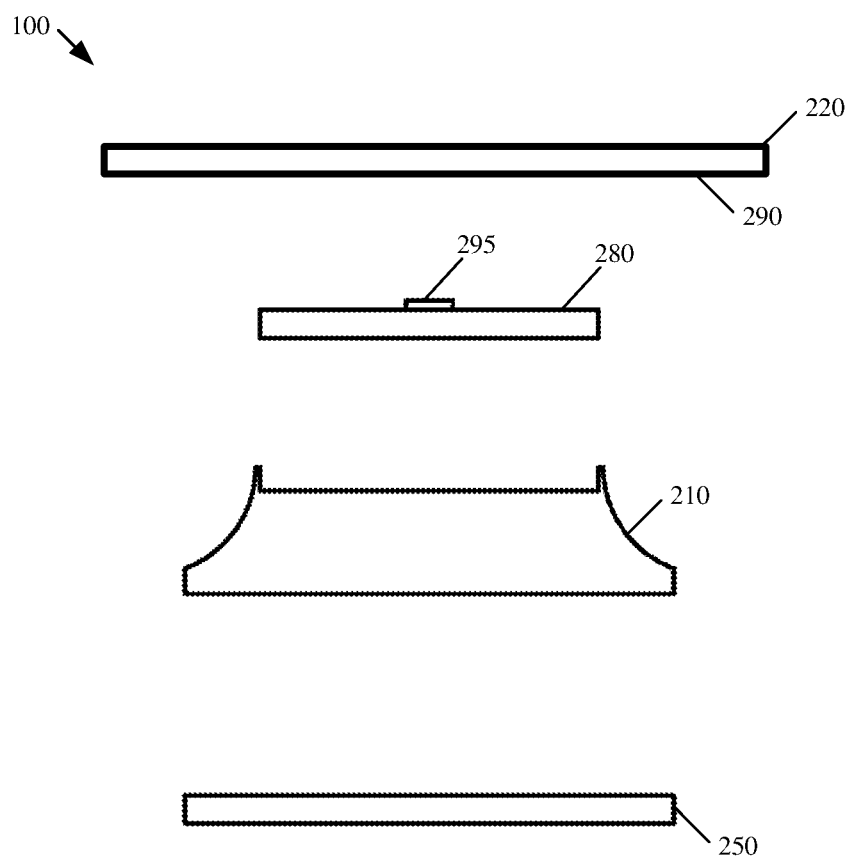
FIG. 7 provides a partial cutaway exploded front view of the recording eraser in accordance with some embodiment described herein FIGS. 8 and 9 conceptually illustrate the optical redirection from the mirrors into the imaging device's effective field of view in accordance with some embodiments described herein.

FIG. 2 provides a top perspective view of recording eraser 100, and FIG. 3 provides a partial cutaway exploded top perspective view of recording eraser 100 in accordance with some embodiments described herein. FIG. 4 provides a bottom perspective view of recording eraser 100, and FIG. 5 provides a partial cutaway exploded bottom perspective view of recording eraser 100 in accordance with some embodiments described herein. FIG. 6 provides a front view of recording eraser 100, and FIG. 7 provides a partial cutaway exploded front view of recording eraser 100 in accordance with some embodiment described herein.

As shown in each of FIGS. 2-7, recording eraser 100 may include base 210 and upper body 220. Upper body 220 may be connected to base 210 near proximal and distal ends by supports 230 (see FIGS. 4 and 6). Supports 230 may raise upper body 220 a distance over base 210 to create a central cavity or opening 240 (see FIG. 6) between upper body 220 and base 210 that runs about the length of recording eraser 100.

The bottom of base 210 may include erasing element 250 and at least one sensor 260. Erasing element 250 may be felt, cloth, or another material that removes markings on a presentation board. Recording eraser 100 may have different erasing elements 250 for different presentation boards and different writing instruments used with the different presentation boards.

For instance, a first recording eraser 100 may have a first erasing element 250 for erasing chalk from a chalkboard, and a second recording eraser 100 may have a second erasing element 250 for erasing ink from a dry-erase board.

In some embodiments, base 210 may support interchangeable erasing elements 250. For instance, base 210 bottom may include Velcro, and each erasing element 250 may also include Velcro to couple to the bottom of base 210. Plugs and/or other fasteners may be used to couple erasing element 250 to base 210 bottom. The interchangeable erasing elements 250 may adapt recording eraser 100 for different presentation boards, and may also ensure proper operation of recording eraser 100. For instance, when one erasing element 250 is saturated or dirty, it may be replaced with a new erasing element 250.

Sensor 260 may track movement of the recording eraser 100 when in use (e.g., a tracking sensor). In some embodiments, sensor 260 may include a low-power optical light source and a light detector. For instance, the optical light source may emit pulses of laser, light emitting diode (LED), infrared, or other light to illuminate the surface of the presentation board. The light detector may scan the illuminated surface to determine if recording eraser 100 is moving across the surface, the distance of each movement, and/or the direction of each movement. The light detector may include a complementary metal-oxide semiconductor ("CMOS") sensor, camera, or another sensor.

Sensor 260 may be positioned centrally about the bottom of base 210, and erasing element 250 may include an aperture at the position of sensor 260. The aperture may provide sensor 260 with an unobstructed view of the presentation board. Sensor 260 can alternatively be located anywhere about the bottom of base 210, and erasing element 250 may have an aperture that is aligned with the position of sensor 260.

The bottom of base 210 may optionally include one or more magnets (not shown). The magnets may be used to retain a position of recording eraser 100 on a magnetic presentation board without user interaction.

The top of base 210 may include a first reflective surface or first mirror 280. An opposite second reflective surface or second mirror 290 may be located on the bottom of upper body 220. Upper body 220 may further include a hood or cover that extends over and around second mirror 290 (see FIGS. 2, 4, and 6). The hood or cover may allow a user to grab recording eraser 100 from the sides without touching, blocking, or otherwise interfering with the reflectance of second mirror 290.

First mirror 280 may be separated from second mirror 290 by the space or cavity 240 between base 210 and upper body 220. The separation may be about equal to the height of supports 230. In some embodiments, first mirror 280 may be the same size as second mirror 290. In some other embodiments, second mirror 290 may have a larger length and/or width than first mirror 280. In some such embodiments, the ends of second mirror 290 may extend beyond the length and width of base 210. Consequently, second mirror 290 may reflect what is around recording eraser 100, and more importantly, may reflect markings on a presentation board surface prior to base 210 contacting the markings and/or the markings being erased by erasing element 250.

First mirror 280 may include an opening for imaging device 295 that may also be disposed in the top of base 210. Imaging device 295 may be a camera, linear scanner, or other visual sensor that can generate images and/or capture visual features on a surface. Imaging device 295 may include a lens. Imaging device 295 lens may extend through the opening of first mirror 280, or may be situated inside the opening. Imaging device 295 may be located about a center of first mirror 280 and/or base 210. In some such embodiments, imaging device 295 lens may be pointed upwards. As will be described in detail below, imaging device 295 may obtain images of markings on a presentation board surface that are around base 210 of recording eraser 100 via reflections from first mirror 280 and second mirror 290.

Some embodiments may alter the positioning of imaging device 295. For instance, in some embodiments, imaging device 295 may be disposed in upper body 220 with imaging device 295 lens pointing downward through an opening in second mirror 290, and with first mirror 280, in base 210, being continuous without any openings. In this configuration, similar optical redirection may be used to focus areas around base 210 into imaging device's 295 field of view.

Imaging device 295 may capture images at a particular resolution. For instance, imaging device 295 may capture images with a pixel resolution of 64×64, 240×240, or higher. Imaging device 295 may also capture images at a particular speed. For instance, imaging device 295 may capture images at a speed of 10 frames per second ("fps") or higher. Accordingly, in some embodiments, imaging device 295 may effectively record video. Higher frame rates allow recording eraser 100 to capture markings on a presentation board even when recording eraser 100 is rapidly moved across the presentation board. Each image taken by imaging device 295 may be timestamped to match the tracking data that is captured at the same time using sensor 260 and/or other sensors of recording eraser 100.

Screws, adhesives, and/or couplers may be used to attach first mirror 280 and/or imaging device 295 to base 210, and to connect upper body 220 to base 210 via supports 230. In some embodiments, base 210 and/or upper body 220 may house other structures and components of recording eraser 100. For instance, one or more of a battery, memory, wireless radio, and microprocessor may be embedded within base 210 or upper body 220. Base 210 may optionally include one or more buttons, switches, and/or ports about a side of base 210 or upper body 220.

The buttons and/or switches may be used to turn on and off recording eraser 100. The buttons and/or switches may also, or alternatively, be used to turn on and off the recording function of recording eraser 100. The buttons may also enable pairing or connectivity between recording eraser 100 and another external device via an internal wireless radio (e.g., Bluetooth, Wifi, etc.).

A port may be used to charge the battery of recording eraser 100 and/or provide an interface by which to retrieve output from recording eraser 100. For instance, an external device may obtain the unprocessed images and tracking data from recording eraser 100 via the port, and may process the images and tracking data to recreate the captured markings in one or more digital files. Similarly, the external device, via the port, may obtain the digital files for the recreated markings when the processing is performed by a processor of recording eraser 100. In some embodiments, the wireless radio may be used, instead of the port, to transfer data to and from recording eraser 100.

Recording eraser 100 may include additional sensors to improve the accuracy of the movement tracking. For instance, base 210 may include, as part of sensor 260 at the bottom of base 210 or as one or more sensors that are integrated in the housing of base 210, a pressure sensor. The pressure sensor may be used to determine when recording eraser 100 is placed on the surface of a presentation board. It should be noted that the same determination (e.g., when recording eraser 100 is placed on or makes content with the surface) may be made using the optical light source and/or light detector of sensor 260.

Recording eraser 100 may further include, in base 210 and/or upper body 220, an accelerometer, gyroscope, magnetometer, and/or other sensors. Outputs of the accelerometer, gyroscope, magnetometer, and/or other sensors may improve the accuracy of the tracked movements, which, in turn, may be used to improve the recreation of the markings from the different images taken by imaging device 295. For instance, the outputs of the accelerometer, gyroscope, magnetometer, and/or other sensors may identify the orientation or rotation of recording eraser 100 during use. The orientation and/or rotation information may be combined with the positional tracking (e.g., coordinates) provided by sensor 260, and may be used to more accurately overlay the images prior to processing.

In some embodiments, recording eraser 100 may include one or more lights. The lights may illuminate the surface that is being erased to improve the clarity and/or quality of the images captured by imaging device 295. In particular, the lights may illuminate a defined area around base 210. The lights may be light emitting diodes ("LEDs"), laser diodes, and/or other light sources. In some embodiments, the lights may be located around base 210 and/or erasing element 250. In some embodiments, the lights may be located about around the edges of upper body 220 with the emitted light being directed downwards towards base 210. More specifically, the lights may be located about the edges of the hood or cover that extends over and around second mirror 290.

As can be seen from the figures, the size, shape, and overall form of recording eraser 100 is similar to that of traditional presentation board erasers. However, this configuration, including distance 240 separating upper body 220 from base 210 and positioning of imaging device 295, may prevent imaging device 295 from capturing a region around recording eraser 100 base 210.

To provide the necessary field of view, multiple imaging devices may be attached and may overhang from either side of upper body 220. The use of multiple imaging devices (e.g., two or more imaging devices) is undesirable because of the costs for such an apparatus, and also the computational complexity to align and stitch together images taken from multiple imaging devices, especially images taken at a high frame rate (e.g., faster than 30 fps). Moreover, the form factor and design implications for having multiple imaging devices positioned about either side of upper body 220 could render the device unusable if the user's fingers cover one or more of the imaging devices when in use.

Another way to provide the necessary field of view would be to raise the upper body 220 several additional inches from base 210 (e.g., increase distance 240 between upper body 220 and base 210), and to place imaging device 295 on upper body 220 so that imaging device 295 would be high enough from base 210 that portions of the presentation board would fall within imaging device's 295 field of view. Separating upper body 220 from base 210 with such a distance would result in an unusable form factor, or at least one that is unsightly, non-portable, and very difficult to hold and operate with one hand.

The preferred embodiments overcome these and other issues by providing recording eraser 100 with a single centrally mounted imaging device to minimize cost and processing power, and by using reflection from mirrors 280 and 290 to increase the working distance or effective field of view of imaging device 295 to cover regions around recording eraser 100 base 210 despite the form factor of recording eraser 100 resembling that of a traditional eraser, the central placement of imaging device 295 in base 210 (or upper body 220 in some other embodiments), and short distance 240 between upper body 220 and base 210 that otherwise constrains imaging device's 295 effective field of view to the underside of upper body 220. Specifically, mirrors 280 and 290 are positioned and used to optically redirect what is around recording eraser 100 into imaging device's 295 effective field of view.

Figure 8:
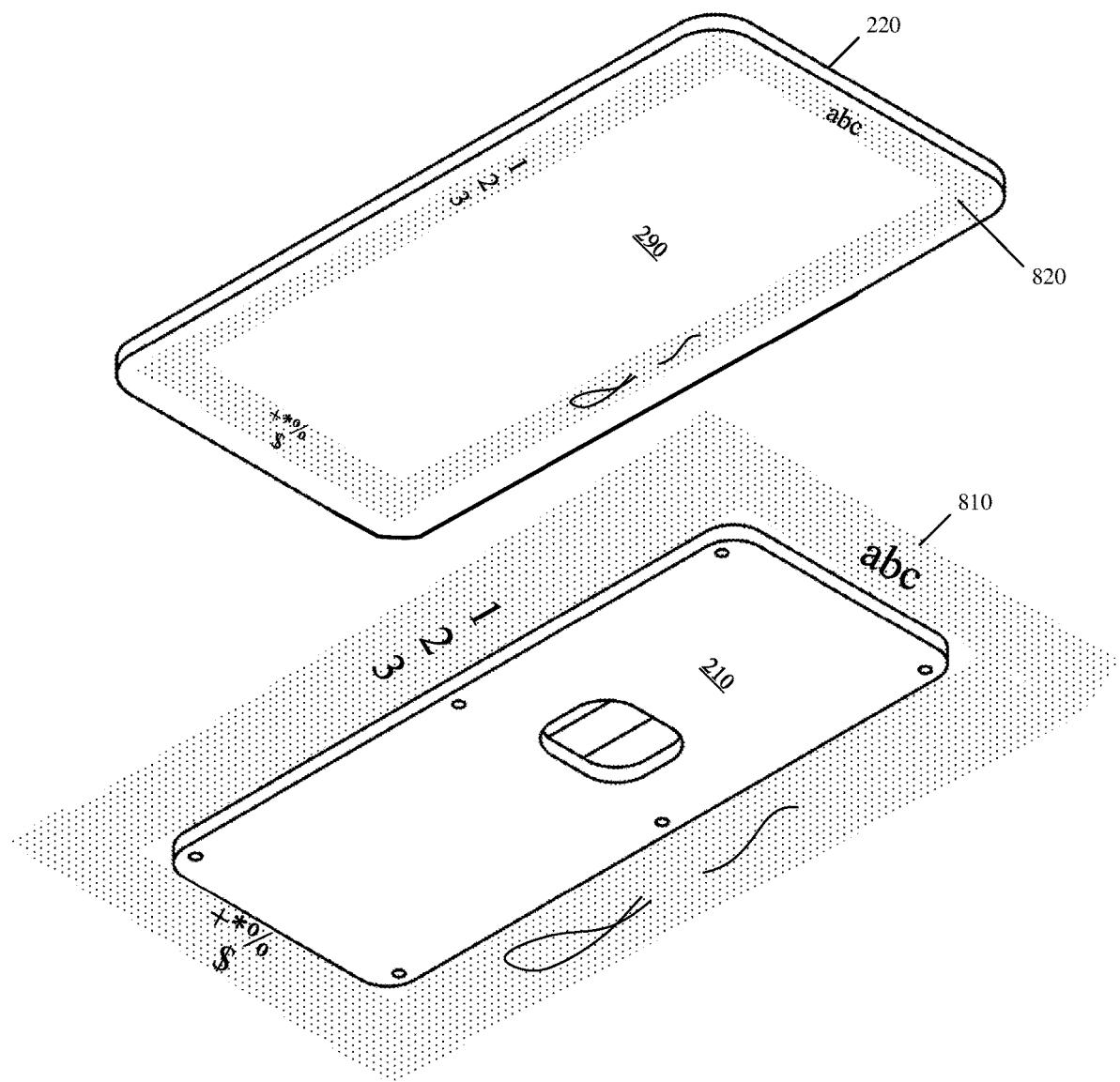
Figure 9:
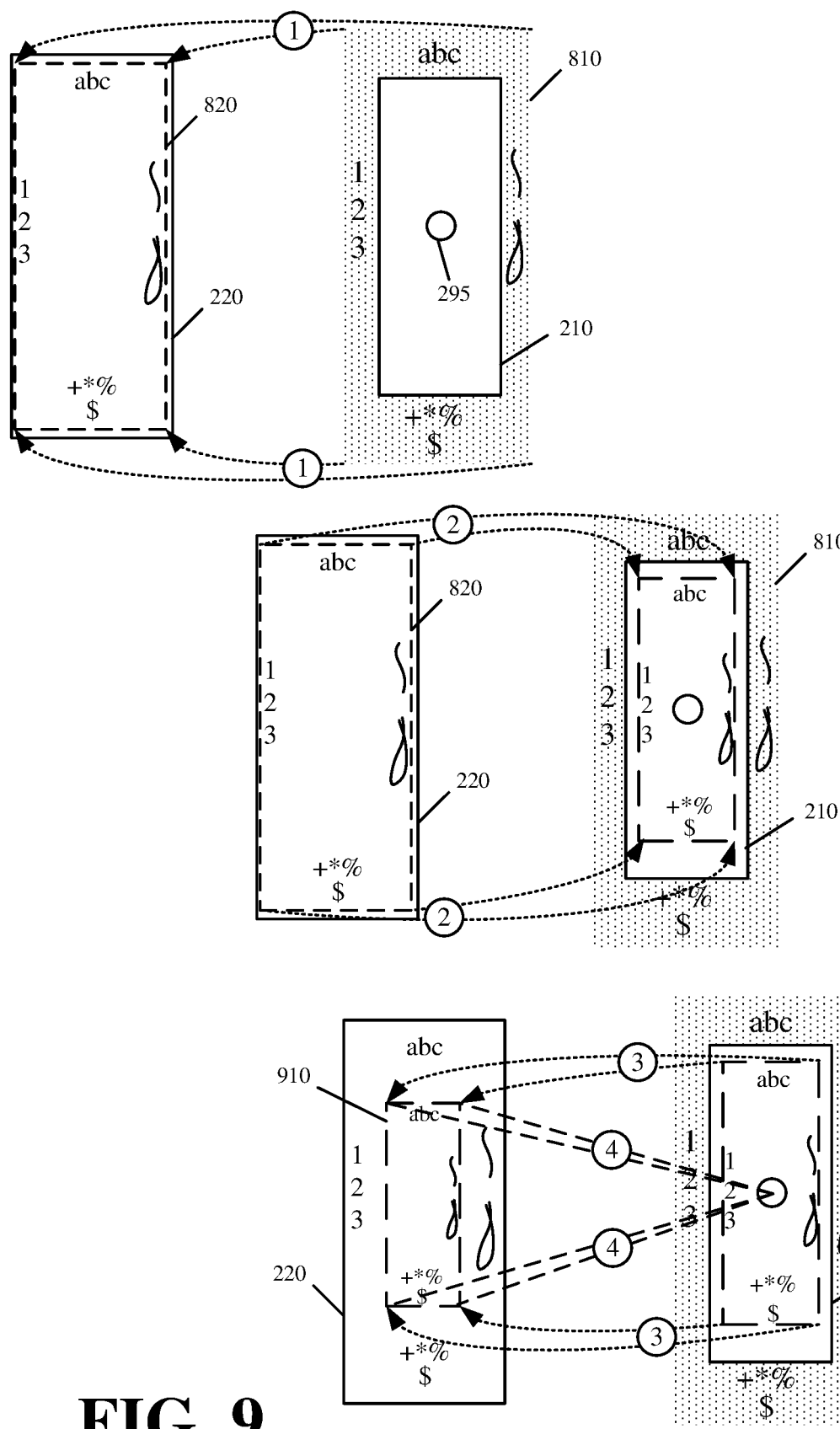

FIGS. 8 and 9 conceptually illustrate the optical redirection from mirrors 280 and 290 into imaging device's 295 effective field of view in accordance with some embodiments described herein. FIG. 8 illustrates an example area 810 surrounding base 210 that is reflected around border 820 of mirror 290 in accordance with some embodiments described herein. Example area 810 may extend one or more inches or centimeters around base 210. When recording eraser 100 is placed over a presentation board, border 820 of mirror 290 may reflect sections of the presentation board surface that fall within example area 810. Consequently, any markings in example area 810 of the presentation board may be reflected onto border 820 of mirror 290.

Upper body mirror 290 is aligned over base mirror 280, and base mirror 280 reflects border 820 towards a center of mirror 290 and into the effective field of view of imaging device 295 that is disposed in a center of base 210 and pointed upwards toward mirror 290. FIG. 9 conceptually illustrates the reflection redirection provided by mirrors 280 and 290 that places an area surrounding recording eraser base 210 into the effective field of view of imaging device 295 in accordance with some embodiments described herein.

FIG. 9 illustrates area 810 around base 210 of recording eraser 100 reflecting (at 1) onto border 820 of upper body mirror 290. The reflection of area 810 on upper body mirror 290 then reflects (at 2) onto base mirror 280, and back towards (at 3) center region 910 of upper body mirror 290 due to the vertical alignment and/or positioning of mirrors 280 and 290. Center region 910 is within the field of view of imaging device 295 such that the images taken (at 4) by imaging device 295 capture the writings, markings, and/or other visible aspects within area 810 surrounding base 210 on all sides and corners. As recording eraser 100 moves, so too does the reflection, allowing imaging device 295 to continuously image what is around recording eraser 100.

Figure 10:
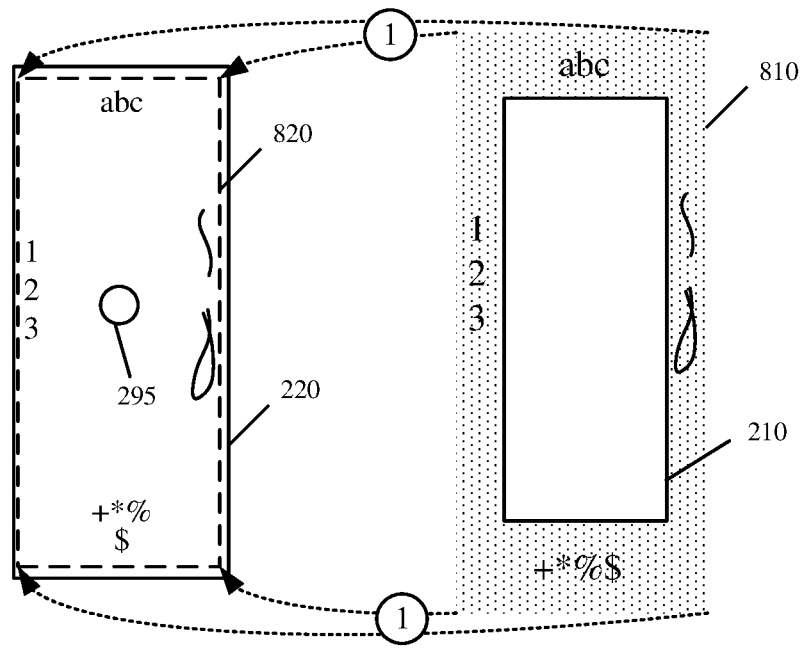
FIG. 10 conceptually illustrates a two-way optical redirection for positioning the reflection of the area around the base into the imaging device's field of view in accordance with some embodiments described herein.
Figure 10:
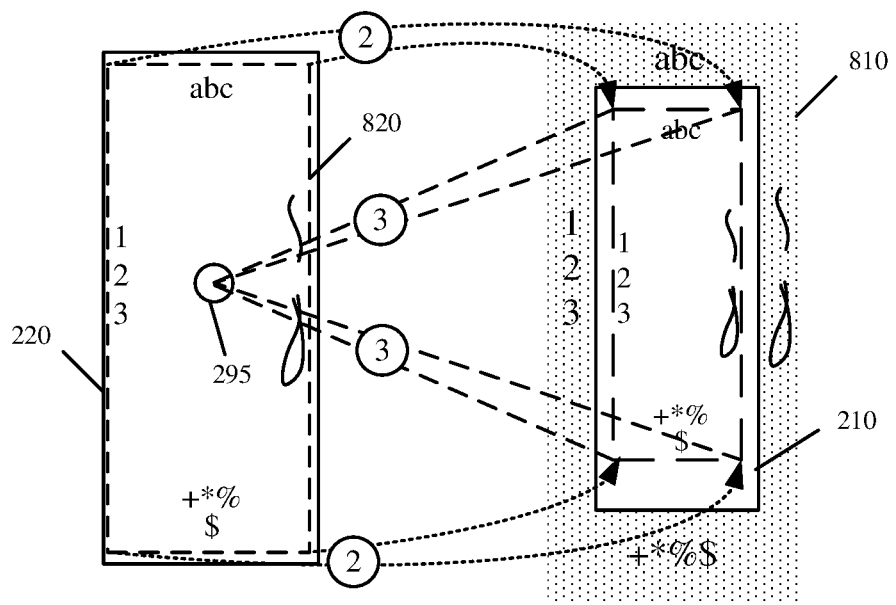

FIG. 9 uses a three-way reflection to place area 810 surrounding base 210 within the effective field of view of upward facing imaging device 295 that is disposed in base 210. As noted above, some embodiments may dispose imaging device 295 in upper body 220, instead of base 210, and direct imaging device 295 downwards. In some such embodiments, the two-way reflection illustrated in FIG. 10 may be used to place area 810 surrounding base 210 within the effective field of view of downward facing imaging device 295 that is disposed in upper body 220 of recording eraser 100. Imaging device 295 may include a wide-angle lens to increase the size of the imaged area (e.g., area 810 reflected onto mirror 210 via the two-way reflection illustrated in FIG. 10).

In some embodiments, mirror 280 and/or mirror 290 are flat mirrors. In some other embodiments, mirror 290 may have a convex shape to reflect more of the area surrounding base 210. Mirrors 280 and/or 290 may also have a non-flat shape to better focus reflections in desired regions of the juxtaposed mirror. In some embodiments, the length and width of mirror 290 can be extended further past the length and width of base 210 to increase the area surrounding base 210 that can be imaged.

In some embodiments, a single mirror 290 and one-way reflection may be used to direct the areas surrounding base 210 into the effective field of view of imaging device 295. In some such embodiments, recording eraser 210 may include the structures illustrated in FIGS. 2-7 except that the base mirror 280 may be removed. Imaging device 295 may still be disposed about a center of base 210 with the imaging device lens directed towards upper body mirror 290. In this single mirror configuration, the reflection of areas surrounding base 210 by mirror 290 to the effective field of view of imaging device 295 may be achieved by replacing imaging device 295 lens with a wide-angle lens, and/or via various optical tricks and image processing techniques. For instance, mirror 290 may have a convex, prism, and/or other shape that reflects the areas surrounding base 210 in near a center of mirror 290 that falls within imaging device's 295 effective field of view. Imaging device 295 may take images of the surrounding areas from the one-way reflection in mirror 290. The images however may be skewed. The skew can be corrected for during image processing by accounting for the angle of incidence, angle of reflection, and/or other properties of mirror 290 that may create the distortion in order to bring the surrounding views into the effective field of view of imaging device 295.

Imaging device 295 begins continuously taking a set of images in response to one or more sensors (e.g., sensor 260) of recording eraser 100 detecting new placement of recording eraser 100 on a surface (e.g., a presentation board), and/or detecting movement of recording eraser 100 after recording eraser 100 has been stationary for a threshold amount of time (e.g., 5 seconds).

Imaging device 295 continues adding images to the current set of images until the movement stops as a result of removing recording eraser 100 from the surface, and/or stopping movement of recording eraser 100 for the threshold amount of time. Each new placement or movement of recording eraser 100 may cause imaging device 295 to capture a different set of images that are stored in memory separate from other sets of images that are captured in response to different placements and/or movements of recording eraser 100. The different sets of images may be stored in different folders, may be named differently, and/or may be differentiated via other identifiers (e.g., timestamps, metadata, etc.).

In some embodiments, recording eraser 100 may wirelessly transmit images from imaging device 295 to memory of a paired or connected external device. In some such embodiments, the images may be stored off recording eraser 100. The storage of the images on an external device may allow recording eraser 100 to operate with less onboard memory. Moreover, the storage of the images on the external device may allow recording eraser 100 to operate for longer periods of time or more erasures as the external device may provide several gigabytes worth of storage for the generated images.

Recording eraser 100 may generate the different sets of images in response to movements of recording eraser 100 occurring at different times. The different sets of images produced in response to different movements of recording eraser 100 allow the same sections of a presentation board to be reused during a presentation, and the images for the captured markings in the same section to not overlap. For instance, a user may write a first sentence on a particular area of a presentation board, and use recording eraser 100 to erase that first sentence. While in use to erase the particular area, recording eraser 100, via imaging device 295, captures a first set of images that collectively capture the first sentence. The user may set recording eraser 100 aside or let go of recording eraser 100 so that it is unmoved for the threshold amount of time, and write a different second sentence on the same particular area of the presentation board. The user may again use recording eraser 100 to erase the second sentence, and recording eraser 100, sensing the new motion, may capture a second set of images that collectively capture the second sentence, and that are separate from the first set of images that collectively capture the first sentence. The first set of images can then be processed to recreate the first sentence, and the second set of images can be separately processed to recreate the second sentence, written in the same section of the presentation board, without affecting the recreation of the first sentence from the first set of images.

Each image taken by imaging device 295 may capture a small area with a radius that extends one or more inches or centimeters from base 210. Accordingly, reconstructing the markings that were erased during one tracked movement of recording eraser 100 may include combining and processing the set of images that were captured during a tracked movement using tracking data that was obtained via sensor 260 and/or other sensors of recording eraser 100 at the same time.

Figure 11:
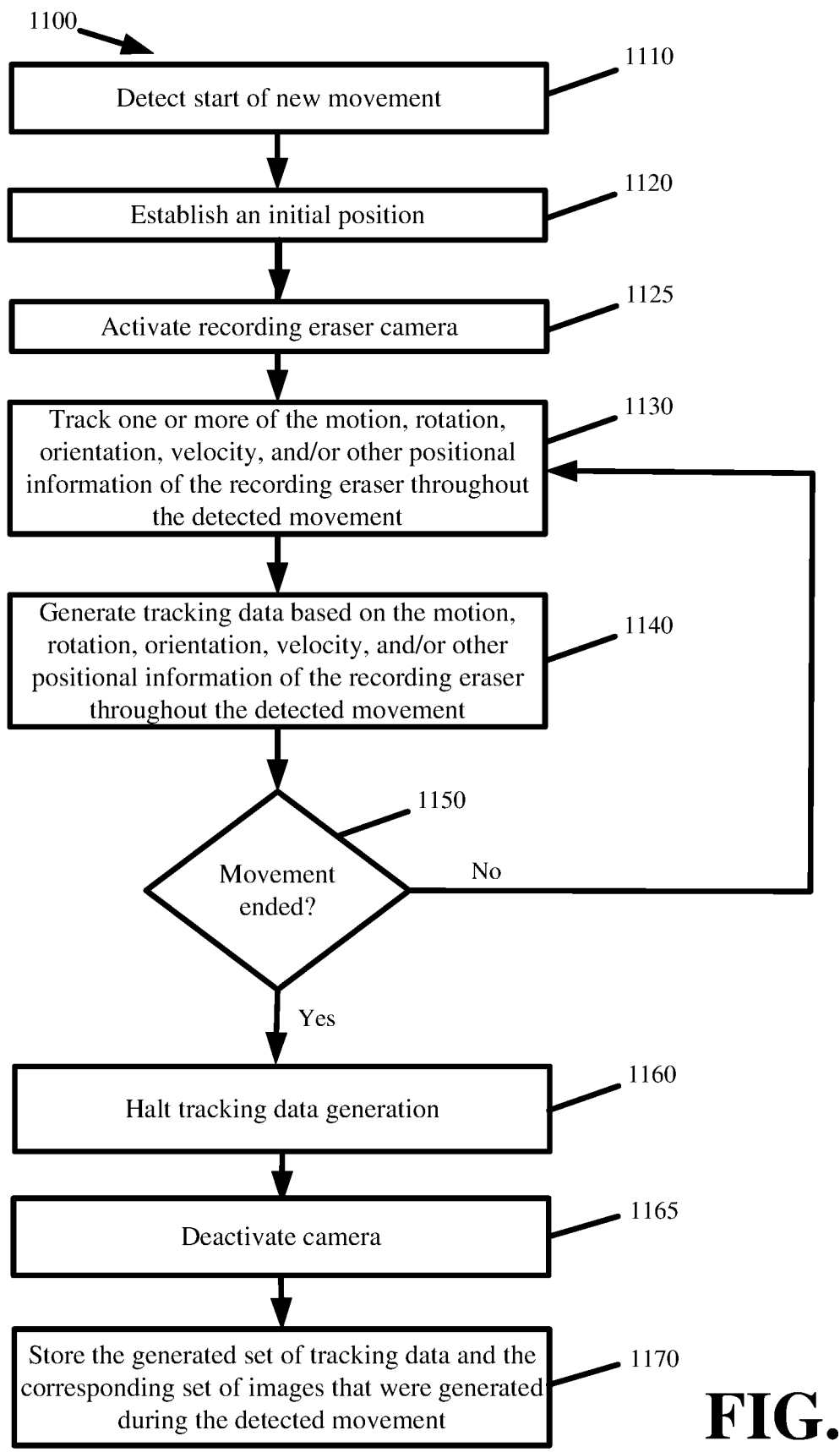
FIG. 11 presents a process for generating tracking data during movement of the recording eraser in accordance with some embodiments described herein.

FIG. 11 presents process 1100 for generating tracking data during movement of recording eraser 100 in accordance with some embodiments described herein. Process 1100 may be performed based on operation of one or more of sensor 260, other sensors, and/or the microprocessor of recording eraser 100.

Process 1100 may include detecting (at 1110) the start of new movement. As noted above, a new movement of recording eraser 100 may be in response to detecting new placement of recording eraser 100 on a surface (e.g., presentation board), and/or detecting a change in position of recording eraser 100 after the position of recording eraser 100 has been being stationary for the threshold amount of time.

In response to detecting the start of the new movement, process 1100 may include establishing (at 1120) an initial position. The initial position may be represented by a relative starting coordinate. For example, the initial position may have a 0 x-axis coordinate and a 0 y-axis coordinate regardless of where recording eraser 100 is on a surface. In some embodiments, the initial position may also, or alternatively, be represented by an angle or vector.

Further in response to detecting the start of the new movement, process 1100 may activate (at 1125) imaging device 295. Imaging device 295 may begin to generate a first set of images that capture markings on the surface before erasure of those markings as a result of the movement moving erasing element 250 of recording eraser 100 over those markings.

Process 1100 may continuously track (at 1130) one or more of the motion, rotation, orientation, velocity, and/or other output from sensor 260 and/or other sensors (e.g., accelerometer, gyroscope, magnetometer, inertial sensor, etc.) of recording eraser 100 throughout the detected movement, and may continuously generate (at 1140) tracking data based on one or more of the motion, rotation, orientation, velocity, and/or other output. The tracking data generation frequency may be aligned with the imaging frequency or frame rate of imaging device 295.

The tracking data may track each movement as a delta or offset from the starting coordinate associated with the initial position, or may track each movement as a delta or offset from a prior coordinate. As a more specific example, a first tracking data instance at the initial position may be defined as a (0,0) coordinate, a second tracking data instance capturing an upwards movement of recording eraser 100 may be defined either as a (0,1) coordinate or (0,+1) delta to the starting positioning, and a third tracking data instance capturing a subsequent rightwards movement of recording eraser 100 may be defined either as a (1,1) coordinate or (+1,0) delta. Additional information from sensor 260 or other sensors of recording sensor 100 may be added to and stored with each tracked data instance. For instance, as noted above, each tracked movement may further specify the angle, rotation, orientation of recording eraser 100 at the time of the movement. In some embodiments, the tracking data may be timestamped as it is generated to allow for subsequent alignment of the recording eraser 100 positioning with images that were taken with imaging device 295 at the same time.

Process 1100 may determine (at 1150) if the detected movement has ended. For instance, the detected movement may end in response to recording eraser 100 being removed off a surface. The detected movement may also end in response to recording eraser 100 not moving a certain distance for the threshold amount of time. An internal timer may be started when recording eraser 100 stops moving. Should the timer reach the threshold amount of time before recording eraser 100 moves at least a certain distance, then movement is determined (at 1150) to have ended.

In response to determining (at 1150—No) that the movement has not ended, process 1100 may continue to track (at 1130) the positional information, and generate (at 1140) tracking data based on the positional information. In response to determining (at 1150—Yes) that the movement has ended, process 1100 may halt (at 1160) tracking data generation, may deactivate (at 1165) imaging device 295 to stop capturing images as part of the set of images for the present movement, and may store (at 1170) the generated set of tracking data and the corresponding set of images that were generated during the same detected movement of recording eraser 100 to local memory. Alternatively, process 1100 may include processing the generated set of tracking data with the corresponding set of images to produce an image file that reconstructs the markings that were erased during the detected movement.

Figure 12:
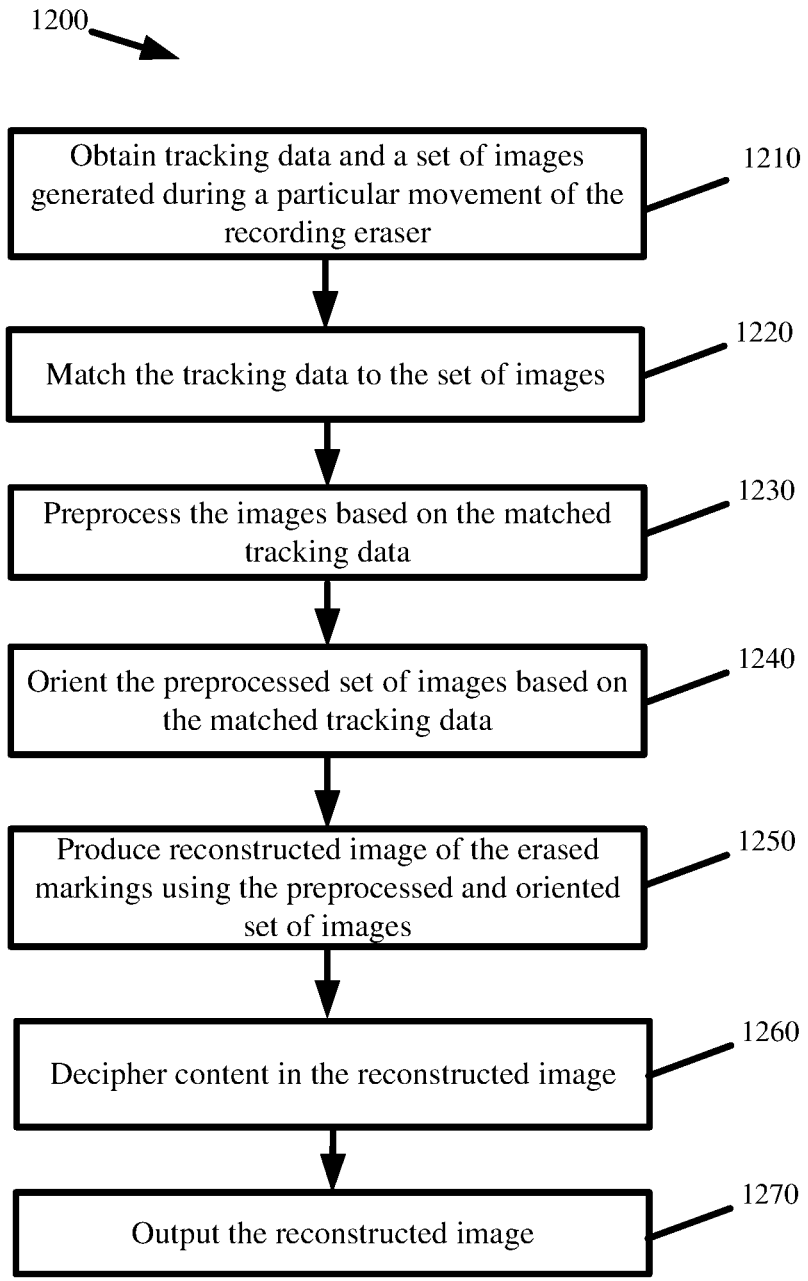
FIG. 12 presents a process for producing the image file that reconstructs the markings that were erased during a particular movement of the recording eraser in accordance with some embodiments described herein.

FIG. 12 presents a process 1200 for producing the image file that reconstructs the markings that were erased during a particular movement of recording eraser 100 in accordance with some embodiments described herein. Process 1200 may be performed using onboard resources of recording eraser 100, or may be performed by an external device.

Process 1200 may include obtaining (at 1210) the tracking data and the set of images that were generated during the particular movement. When performing process 1200 using internal resources of recording eraser 100, the tracking data and the set of images may be obtained directly from memory of recording eraser 100. When performing process 1200 using resources of an external device, the tracking data and the set of images may be obtained via a wireless network connection to recording eraser 100 or via a wired port.

Process 1200 may include matching (at 1220) the tracking data to the set of images. For instance, process 1200 may include identifying a tracking data instance that identifies the angle, position, rotation, orientation, and/or other positional information of recording eraser 100 at the time a particular image of the set of images was taken. In some embodiments, the matching (at 1220) may be based on aligning the tracking data timestamps with the image timestamps.

Process 1200 may include preprocessing (at 1230) the images based on the matched tracking data. In some embodiments, the preprocessing (at 1230) may include cropping operations that remove irrelevant portions from the images so that only the pertinent data is preserved and used when producing the file that reconstructs the markings that were erased as a result of the particular movement of recording eraser 100. Other operations may be performed during the preprocessing (at 1230) in order to remove unwanted content from the images. For instance, shadow removal operations may be performed during the preprocessing (at 1230) to remove shadows and/or adjust shading of the images.

Figure 13:
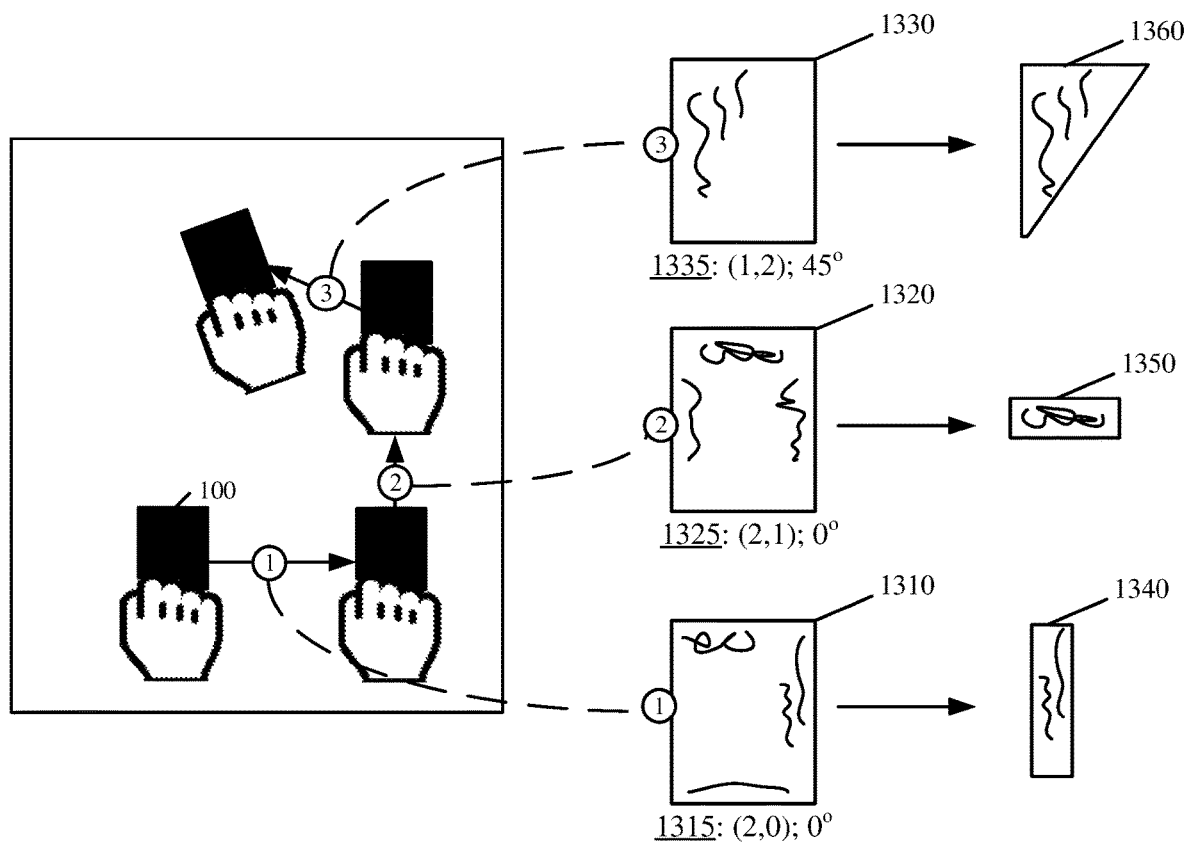
FIG. 13 conceptually illustrates the preprocessing of images in accordance with some embodiment described herein.

FIG. 13 conceptually illustrates the preprocessing of images in accordance with some embodiment described herein. FIG. 13 illustrates first image 1310 and first tracking data instance 1315 providing positional information about recording eraser 100 when first image 1310 is taken, second image 1320 and second tracking data instance 1325 providing positional information about recording eraser 100 when second image 1320 is taken, and third image 1330 and third tracking data instance 1335 providing positional information about recording eraser 100 when third image 1330 is taken.

When preprocessing first image 1310, first tracking data 1315 identifies a rightward movement of recording eraser 100. Accordingly, data from the top, left, and bottom of first image 1310 are irrelevant as the data from these sections of first image 1310 do not capture any markings that were erased during the rightward movement. For instance, the top and bottom sections of first image 1310 capture areas above and below recording eraser 100 that are not erased during the rightward movement, and the left section of first image 1310 captures an area that is already erased because of the rightward movement. From first tracking data 1315, the preprocessor can determine that the right section of first image 1310 contains the pertinent data for the markings that were erased during the rightward movement. Accordingly, the top, bottom, and left sections of first image 1310 may be removed during preprocessing to generate preprocessed first image 1340. Preprocessed first image 1340 retains image data from the right section of first image 1310, resulting in a file or image 1340 that is smaller in size (e.g., pixels corresponding to the right section of first image 1310) than first image 1310 (e.g., all pixels of first image 1310). For instance, first image 1310 may be 480×480 pixels in size, and preprocessed first image 1340 may be 120×420 pixels in size. It should be noted that a center section of first image 1310 may also be removed from preprocessed first image 1340 because the center section may not capture any areas surrounding base 210, and instead may simply capture a reflection of base 210.

When preprocessing second image 1320, second tracking data 1325 identifies an upward movement of recording eraser 100. Accordingly, data from the left, right, and bottom of second image 1320 are irrelevant as the data from these sections of second image 1320 do not capture any markings that were erased during the upward movement. For instance, the right and left sections of second image 1320 capture areas to the right and left of recording eraser 100 that are not erased during the upward movement, and the bottom section of second image 1320 captures an area that is already erased because of the upward movement. Accordingly, the left, right, and bottom sections of second image 1320 may be removed during preprocessing to generate preprocessed second image 1350.

Third tracking data 1335 identifies a rotation of recording eraser 100 and a diagonal upwards left movement. In this case, the relevant data in third image 1330 may reside in the upper left section of image 1330 with the lower right section of image 1330 containing irrelevant data for markings surrounding recording eraser 100 that were not erased, or markings that were already erased because of the diagonal upwards left movement. Accordingly, preprocessed third image 1360 may be generated to preserve relevant data from third image 1330 while discarding the irrelevant image data.

In some embodiments, preprocessing the set of images may also include discarding overlapping images or images having the same tracking data. For instance, recording eraser 100 may be moved slowly or movement of recording eraser 100 may be halted for a period of time that is less than the threshold amount of time for stopping the recording. The slow movement or temporary halted movement may result in imaging device 295 taking two or more images of the same or significantly overlapping portion of the presentation board. These images may be associated with the same tracking data (e.g., same relative positioning), and may therefore be duplicative. Accordingly, preprocessing may remove the duplicate images to reduce the overall processing effort needed to reconstruct the markings from the set of images.

In some other embodiments, preprocessing the set of images may include supersampling or combining images with the same tracking data or images with overlapping portions to reduce the number of images while also increasing the clarity of the retained images.

With reference back to FIG. 12, process 1200 may further include orienting (at 1240) the preprocessed set of images based on the matched tracking data. Orienting (at 1240) the preprocessed set of images may include rotating, aligning, layering, and/or otherwise positioning the preprocessed set of images according to the tracking data so that a composite image may be generated from the preprocessed set of images.

Process 1200 may then include producing (at 1250) a reconstructed image of the erased markings using the preprocessed and oriented set of images. In some embodiments, producing the reconstructed image may include stitching together the preprocessed and oriented set of images by combining and/or merging the images based on overlapping or common areas determined in part from the image data and also the tracking data associated with the image data. More specifically, the microprocessor of recording eraser 100 or microprocessor of another external device may align images that were taken in sequential order based on the matched tracking data, may modify the alignment based on areas of two sequential images that are identical or overlapping, may adjust properties of the images (e.g., skew, lighting, contrast, etc.), and may combine the pixel data from the aligned images to generate the composite reconstructed image.

Process 1200 may further include deciphering (at 1260) content in the reconstructed image. For instance, the reconstructed image may be scanned against a dictionary of characters, symbols, and/or markings in order to recognize the markings in the reconstructed image. The recognized markings may be converted into text, symbols, and/or other data that can be selected or otherwise interacted with as opposed to just an image with no selectable elements. The deciphering (at 1260) may also be used to sharpen the resulting reconstructed image. For instance, the reconstructed image may have various blurry markings for text. By identifying the text, the blurry markings may be replaced or sharpened with the corresponding characters forming the text.

Process 1200 may then include outputting (at 1270) the reconstructed image. For instance, the reconstructed image may be output to memory of recording eraser 100, memory of an external device, or a display of an external device for viewing.

In some embodiments, process 1200 may be performed as a batch process for different sets of images that were generated at different times of a particular presentation or at different uses of recording eraser 100. For instance, recording eraser 100 may be used multiple times during a presentation, and may generate a different set of images during each use (e.g., completed movement). After the presentation, process 1200 may be run as a batch process to output a reconstructed image for each of the different sets of images.

Some embodiments may further recreate a presentation from a set of reconstructed images. The recreated presentation may present the reconstructed images in a relevant timeline rather than the order in which the erasures were made. To do so, some embodiments may include a microphone in base 210 or upper body 220 of recording eraser 100. The microphone may be a detachable component that can be attached to or removed from recording eraser 100 as desired. In some other embodiments, the microphone may be separated from recording eraser 100. For instance, the microphone may be worn by the presenter or may be attached to the presentation surface that is used in conjunction with recording eraser 100.

The microphone may record speech during a presentation. Voice recognition software may be used to process the speech, and match the identified speech to identified text and/or content in the reconstructed images that were output as a result of images created during that same presentation. The reconstructed images may then be ordered according to the time for when the identified text and/or content in the reconstructed images are spoken in the recorded presentation speech. By using speech to recreate the presentation, a user may use recording eraser 100 to erase presentation markings in any arbitrary order as opposed to forcing the user to erase the markings in the order that are written on the presentation board.

Figure 14:
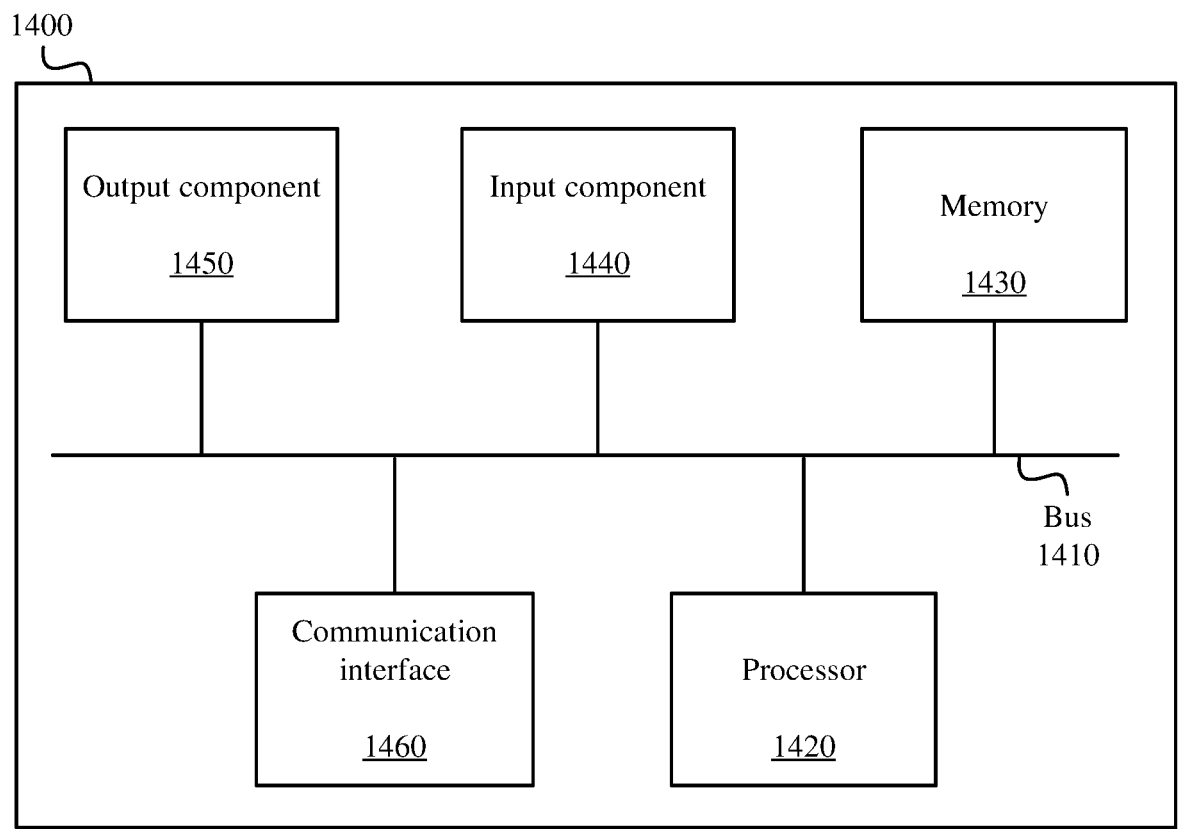
FIG. 14 illustrates example components of one or more devices, according to one or more embodiments described herein.

FIG. 14 is a diagram of example components of device 1400. Device 1400 may be used to implement certain parts of recording eraser 100 described above or may provide additional components for recording eraser 100 described above. Device 1400 may include bus 1410, processor 1420, memory 1430, input component 1440, output component 1450, and communication interface 1460. In another implementation, device 1400 may include additional, fewer, different, or differently arranged components.

Bus 1410 may include one or more communication paths that permit communication among the components of device 1400. Processor 1420 may include a processor, microprocessor, or processing logic that may interpret and execute instructions. Memory 1430 may include any type of dynamic storage device that may store information and instructions for execution by processor 1420, and/or any type of non-volatile storage device that may store information for use by processor 1420.

Input component 1440 may include a mechanism that permits an operator to input information to device 1400, such as a keyboard, a keypad, a button, a switch, etc. Output component 1450 may include a mechanism that outputs information to the operator, such as a display, a speaker, one or more LEDs, etc.

Communication interface 1460 may include any transceiver-like mechanism that enables device 1400 to communicate with other devices and/or systems. For example, communication interface 1460 may include an Ethernet interface, an optical interface, a coaxial interface, or the like. Communication interface 1460 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1400 may include more than one communication interface 1460. For instance, device 1400 may include an optical interface and an Ethernet interface.

Device 1400 may perform certain operations relating to one or more processes described above. Device 1400 may perform these operations in response to processor 1420 executing software instructions stored in a computer-readable medium, such as memory 1430. A computer-readable medium may be defined as a non-transitory memory device. A memory device may include space within a single physical memory device or spread across multiple physical memory devices. The software instructions may be read into memory 1430 from another computer-readable medium or from another device. The software instructions stored in memory 1430 may cause processor 1420 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the term "threshold" is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance.

Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A recording eraser for erasing content while simultaneously capturing the content that is being erased for recreation in a digital format, the recording eraser comprising:
   a bottom first section comprising:
   (i) an erasing material for removing markings from a presentation board or surface, the erasing material being disposed on a bottom of the bottom first section;
   (ii) an imaging device affixed to the bottom first section and oriented upwards and opposite to the erasing material;
   a top second section positioned above the bottom first section, the top second section comprising a first mirror, the first mirror reflecting a region on at least one side of the bottom first section into the imaging device; and
   a set of supports that connect the top second section to the bottom first section with the first mirror being positioned over the imaging device.

2. The recording eraser of claim 1, wherein the bottom first section further comprises a tracking sensor, and wherein the tracking sensor is positioned over an opening in the erasing material.

3. The recording eraser of claim 2, wherein the imaging device activates in response to the tracking sensor detecting start of a new movement, and deactivates in response to the tracking sensor detecting stationary positioning of the recording eraser for a threshold period of time or removal of the recording eraser from the presentation board or surface.

4. The recording eraser of claim 2 further comprising at least one of a gyroscope, accelerometer, magnetometer, or inertial sensor that supplements tracking data of the tracking sensor with rotation or orientation of the recording eraser.

5. The recording eraser of claim 1, wherein the imaging device generates a set of images of the region reflecting onto the first mirror during movement of the recording eraser.

6. The recording eraser of claim 1, wherein the first bottom section further comprises a second mirror that is positioned below the first mirror of the top second section and that is positioned to reflect a border of the first mirror to a center of the first mirror.

7. The recording eraser of claim 1, wherein the first mirror extends over and beyond the bottom first section with one or more of a length and a width that is greater than a length or a width of the bottom first section.

8. The recording eraser of claim 1, wherein the erasing material removes at least one of chalk and ink from the presentation board or surface.

9. The recording eraser of claim 1, wherein the top second section further comprises a hood covering a top side of the first mirror.

10. The recording eraser of claim 9, wherein the hood further covers sides of the first mirror by extending vertically downwards from sides of the first mirror a distance that is less than a distance separating the first mirror from the erasing material.

11. The recording eraser of claim 1 further comprises a battery, memory that stores images generated by the imaging device, and a processor.

12. A recording and erasing device comprising:
an erasing material disposed on a bottom of the recording and erasing device;
a first reflective surface that is positioned over the erasing material and that reflects a region on at least one side of the recording and erasing device;
an imaging device disposed between the erasing material and the first reflective surface and oriented upwards toward the first reflective surface; and
one or more processors configured to:
detect a first movement of the recording and erasing device;
obtain a first set of images of the first reflective surface using the imaging device throughout the first movement, the first set of images capturing a region on at least one side of the recording and erasing device that reflects onto the first reflective surface;
store the first set of images in response to completion of the first movement occurring as a result of the recording and erasing device halting movement for a threshold amount of time or being removed off a surface;
detect a second movement of the recording and erasing device;
obtain a different second set of images of the first reflective surface using the imaging device throughout the second movement; and
store the second set of images separate from the first set of images in response to completion of the second movement.

13. The recording and erasing device of claim 12, wherein the one or more processors are further configured to:
generate a composite image of markings erased by the erasing material during the first movement from the first set of images.

14. The recording and erasing device of claim 12 further comprising a tracking sensor disposed on the bottom of the recording and erasing device and aligned over an opening in the erasing material.

15. The recording and erasing device of claim 14, wherein the one or more processors are further configured to:
obtain tracking data from the tracking sensor throughout the first movement and the second movement, the tracking data comprising positional information about the recording and erasing device.

16. The recording and erasing device of claim 15, wherein the one or more processors are further configured to:
preprocess the first set of images based on the tracking data, wherein preprocessing the first set of images comprises determining, from the tracking data, a direction the recording and erasing device is moved when a particular image of the first set of images is taken, and discarding image data, from the particular image, that corresponds to an area at a side of the recording and erasing device that is opposite to the direction the recording and erasing device is moved.

17. The recording and erasing device of claim 15, wherein the one or more processors are further configured to:
provide a first timestamp for each instance of tracking data, the first timestamp corresponding to a time at which positional information is obtained for an instance of the tracking data;
provide a second timestamp for each image of the first set of images, the second timestamp corresponding to a time at which an image of the first set of images is taken by the imaging device; and
determine a position of the recording and erasing device at each image of the first set of images by matching a first timestamp of a tracking data instance from the tracking data to the second timestamp of one image from the first set of images.

18. The recording and erasing device of claim 12 further comprising at least one port or wireless radio, and wherein the one or more processors are further configured to:
output one or more of the first set of images or a composite image via the port or wireless radio.

19. The recording and erasing device of claim 12 further comprising a second reflective surface that is positioned below the first reflective surface and that is positioned to reflect off the first reflective surface, wherein the second reflective surface reflects a border of the first reflective surface to a center of the first reflective surface.

* * * * *